United States Patent [19]

Tabuki

[11] Patent Number: 5,706,427
[45] Date of Patent: Jan. 6, 1998

[54] AUTHENTICATION METHOD FOR NETWORKS

[75] Inventor: Takaaki Tabuki, Tokyo, Japan

[73] Assignee: Cadix Inc., Tokyo, Japan

[21] Appl. No.: 671,241

[22] Filed: Jun. 27, 1996

[30] Foreign Application Priority Data

Sep. 8, 1995 [JP] Japan .................. 7-231160

[51] Int. Cl.$^6$ .................................................. G06F 17/00
[52] U.S. Cl. ........................ 395/187.01; 395/188.01
[58] Field of Search ........................ 395/186, 187.01, 395/188.01, 609, 610; 380/3, 4, 23, 25

[56] References Cited

U.S. PATENT DOCUMENTS

| | | | |
|---|---|---|---|
| 4,799,153 | 1/1989 | Hann et al. | 195/187.01 |
| 5,204,961 | 4/1993 | Barlow | 395/187.01 |
| 5,241,594 | 8/1993 | Kung | 380/4 |
| 5,278,904 | 1/1994 | Servi | 380/23 |
| 5,388,212 | 2/1995 | Grube et al. | 395/186 |
| 5,455,953 | 10/1995 | Russell | 395/187.01 |
| 5,469,576 | 11/1995 | Dauerer et al. | 395/186 |
| 5,481,720 | 1/1996 | Loucks et al. | 395/187.01 |
| 5,491,752 | 2/1996 | Kaufman et al. | 380/30 |
| 5,495,533 | 2/1996 | Linehan et al. | 380/21 |
| 5,497,421 | 3/1996 | Kaufman et al. | 380/23 |
| 5,506,961 | 4/1996 | Carlson et al. | 395/186 |
| 5,534,855 | 7/1996 | Shockley et al. | 380/25 |
| 5,535,276 | 7/1996 | Ganesan | 380/25 |
| 5,544,322 | 8/1996 | Cheng et al. | 380/25 |
| 5,560,008 | 9/1996 | Johnson et al. | 395/186 |
| 5,581,700 | 12/1996 | Witte | 395/188.01 |

OTHER PUBLICATIONS

Neuman et al., "Kerberos: An Authenticatin Service for Computer Networks", IEEE Communications Magazine, vol. 32, Iss. 9, pp. 33–38, Sep. 1993.

Laferriere et al., "Authentication and Authorization Technqiues", Carnahan Conf. on Securiity Technmology, IEEE, pp. 164–170, 1993.

Woo et al., "Authentication for Distributed Systems", IEEE Computer Magazine, vol. 25, Iss. 1, pp. 39–52, Jan. 1992.

*Primary Examiner*—Robert W. Beausoliel, Jr.
*Assistant Examiner*—Joseph E. Palys
*Attorney, Agent, or Firm*—Oliff & Berridge, P.L.C.

[57] ABSTRACT

A method for authenticating users on networks includes an application server requesting a user host to send authentication data to a verification server. The verification server maintains a database of valid authentication data, against which it compares and verifies the authentication data it receives from the user host. The verification result is sent to the application server, which authenticates the user based on the result. Therefore, the configuration of the application server is simplified. The verification server can be used by a plurality of application servers, allowing for the efficient use of resources on a network.

11 Claims, 6 Drawing Sheets

| | | | |
|---|---|---|---|
| | | | FLAG |
| | | | SYS UNIQE KEY |
| | | | REGISTERED TABLET TYPE |
| | | | SIGNATURE DATA |
| | | | NAME |
| | | | DATA OF BIRTH |
| | | | PHONE # |
| | | | CREATION DATE |
| | | | CREATION HOST |
| | | | LAST ACCESS DATE |
| | | | LAST ACCESS BY |
| | | | ACCESS COUNT |
| | | | FAILURE COUNT |
| | | | |

SYSTEM REQUIRED ITEMS: FLAG through PHONE #
OPTIONAL FIELDS: CREATION DATE through FAILURE COUNT

Fig. 3

| | | | VERIFICATION SERVER NAME |
|---|---|---|---|
| | | | FLAG |
| | | | SYS UNIQE KEY |
| | | | APPLICATION USER KEY |
| | | | ADDITIONAL APPLICATION USER KEY |
| | | | CREATION DATE |
| | | | LAST ACCESS DATE |
| | | | LAST ACCESS BY |
| | | | ACCESS COUNT |
| | | | FAILURE COUNT |
| | | | |
| | | | |
| | | | |
| | | | |
| | | | |
| | | | |

APPLICATION OPTIONAL FIELDS

Fig. 4

VERIFICATION SERVER PROTOCOL

DATA TYPES COMMON TO ALL REQUESTS: DATA VERSION, ENCRYPTION TYPE, COMPRESSED TYPE

| REQUEST | DATA ITEMS DEPENDENT ON REQUEST | RETURNED VALUE | EXPLANATION |
|---|---|---|---|
| KEY REGISTRATION | NECESSARY ITEMS (NAME, BIRTH DATE, PHONE) | SYSTEM UNIQE KEY ERROR | PROVIDES VERIFICATION SERVER WITH NECESSARY ITEMS AND OBTAINS SYS UNIQ KEY (REGISTRATION KEY). |
| SIGNATURE DATA REGISTRATION | SYSTEM UNIQUE KEY, 3 SIGNATURE DATA, TABLET TYPE | OK/ERROR UNSTABLE | SEND A NUMBER OF SIGNATURE DATA TOGETHER WITH REGISTRATION KEYS AND REGISTER THE SIGNATURE |
| VERIFICATION | SYSTEM UNIQE KEY, SIGNATURE DATA, TABLET TYPE, MESSAGE ID | YES NO MAY BE ERROR | SEND SIGNATURE DATA FOR VERIFICATION TOGETHER WITH REGISTRATION KEY AND REQUEST VERIFICATION. IF VERIFICATION PREPARATION HAS BEEN REQUESTED, ADD MESSAGE. |
| VERIFICATION REQUEST | SYSTEM UNIQUE KEY | ERROR MESSAGE ID, ENCRYPTION KEY | REQUEST THAT SIGNATURE DATA CORRESPONDING TO REGISTRATION KEY BE READ FROM RDB IN ADVANCE. VERIFICATION USING RETURNED MESSAGE ID IS ALSO POSSIBLE. |

Fig. 5

AUTHENTICATION METHOD FOR NETWORKS

BACKGROUND OF THE INVENTION

1. Field of the Invention

The invention relates to a method for the authentication of application users, and in particular to the authentication of users on a network.

2. Description of the Prior Art

In banking and other service industries, establishing the identities of clients, in other words, authentication, is an extremely important problem. This is in order to guard against attempts by an impostor to withdraw money from or deposit money into an account.

The orthodox method of authentication is to check by asking to see some form of identification, such as a drivers license. However, with the proliferation of automatic telling machines and other such devices in recent years, means of authentication using magnetic cards and passwords have come into widespread use.

Such means of authentication are also necessary in fields other than banking. For example, at research institutions, in order to prevent the leakage of secrets, often only those with the proper clearance are permitted to enter certain restricted areas. Membership clubs also require means of identification and authentication to prove membership. At research institutions and membership clubs, the use of magnetic cards, passwords, and membership cards is quite suitable. However, magnetic cards and membership cards can be lost, and passwords can easily be forgotten. Thus, means of establishing the identity of an individual using biometric physical quantities such as fingerprints, retinal patterns, etc. as data for authentication (hereinafter, authentication data) have also been proposed.

The use of signatures, a form of biometric physical quantity, in the endorsement process for electronic business documents for identification and approval is natural. Recent years have witnessed the popularization of the use of CAD in enterprises, and signature data stored in the form of images can be pasted onto CAD data to indicate approval.

With the development of networks in recent years, it is now possible to provide a variety of services on network. Internet, for example, provides a wide spectrum of multimedia titles, such as WWW (World Wide Web). In some cases, as with services in banking, etc., access to these services is granted only to individuals with the proper qualifications, and therefore authentication is also an extremely important issue in network services.

However, in authentication to establish the identities of individuals on a network, use of the above-mentioned biometric authentication data is generally extremely difficult. For example, it would be necessary to install devices to read retinal patterns and fingerprints or palmprints at each and every terminal, and a system for relaying such physical quantities over the network would have to be devised.

As a result, attention is focusing on the use of signature data as a biometric physical quantity that can be used on networks. Signature data has superior properties; for example, it can be easily input using a so-called tablet, and not only the two-dimensional data, but writing speed as well as changes in stylus pressure can also be included as authentication data to establish the identity of the individual. A further characteristic is that tablets can generally be added at a reasonable price, making it possible to keep the cost of terminals low.

As described above, aside from passwords, biometric authentication data such as signature data are used in networks as authentication data.

However, with the increasing size of networks, the types of application servers providing services have increased, and the number of clients receiving such services is reaching an extremely large scale. As a result, having to individually authenticate all client identifications is becoming too large a burden on each application server. In particular, in cases such as Internet, which is expanding on a worldwide scale, there are many instances where the distance between the application server and the client receiving its services are extremely large. In such cases, exchanges of authentication data can result in an increase in the volume of traffic on the network.

The present invention was made to resolve such problems. The purpose of the invention is, by establishing on the network independent of the application server a verification function to authenticate network clients, to alleviate the burden on the application server and to provide a means for client authentication that can be performed easily.

SUMMARY OF THE INVENTION

In accordance with a first aspect of the invention, in order to resolve the above-mentioned problem, with respect to its means of authentication, the application server on the network first includes two steps: a requesting step in which the application server requests the user to send authentication data to a verification server; a sending step in which the user, in response to the request of the application server received during the authentication data requesting step, sends the authentication data of the user together with the identification data of the user to the verification server.

Thus, the invention is characterized in that the application server sends authentication data to an external verification server, consigning the verification process to an external service. By consigning the verification process to an external service, the application server itself is freed from the need to maintain a database for such verifications.

Further, the first aspect is characterized in that it is a network authentication means in which the verification server comprises: a verification step in which the received authentication data is verified to determine whether it really is the authentication data of the user for whom identification data has been received; a verification result reporting step in which the server sends a verification result back to the application server; and an authentication step in which the application authenticates the aforementioned user.

By means of such a configuration, in accordance with the invention, the application server is freed from the need to maintain its own verification data, and the verification process necessary for authentication can be assigned to a verification server.

Next, in accordance with a second aspect of the invention, with respect to the authentication means for authenticating application clients of a network application server, the application server is first undergoes with an authentication data requesting step in which the user is requested to send authentication data to a verification server, and a verification preparation request step in which the application server sends the identification data of the user to the verification server, requesting that the correct authentication data of the user be read in advance.

In other words, before the authentication data becomes available, the identity of the user is made known to the verification server, allowing for the verification server to read the correct authentication data from its storage device in advance. This way, when the authentication data is sent to the verification server, the verification process can be executed without delay.

Thus, apart from the above-mentioned step, the second aspect, as with the first aspect, includes the following steps.

In other words, according to the second aspect is that, in addition to the above-mentioned step, the network authentication means is characterized in that it comprises: a data sending step in which the user, in response to the request from the application server received during the aforementioned authentication data requesting step, sends the authentication data of the user together with the identification data of the user to a verification server; a verification step in which the verification server verifies that the aforementioned authentication data matches the authentication data of the user for whom the identification data was sent; a verification result reporting step in which the verification server sends a verification result back to the application server; and an authentication step in which, based on the verification result sent back in the verification result reporting step, the application server authenticates authorized clients.

By means of such a configuration, authentication means of the second aspect provides for speedy authentication.

BRIEF DESCRIPTION OF THE DRAWINGS

FIG. 3. Table showing the structure of the RDB in the verification server.

FIG. 4. Table showing the structure of the RDB in the application server.

FIG. 5. Table explaining the protocol supported by the verification server.

DESCRIPTION OF THE PREFERRED EMBODIMENT

A preferred embodiment of the invention is described below on the basis of the accompanying figures.

Figure 1:
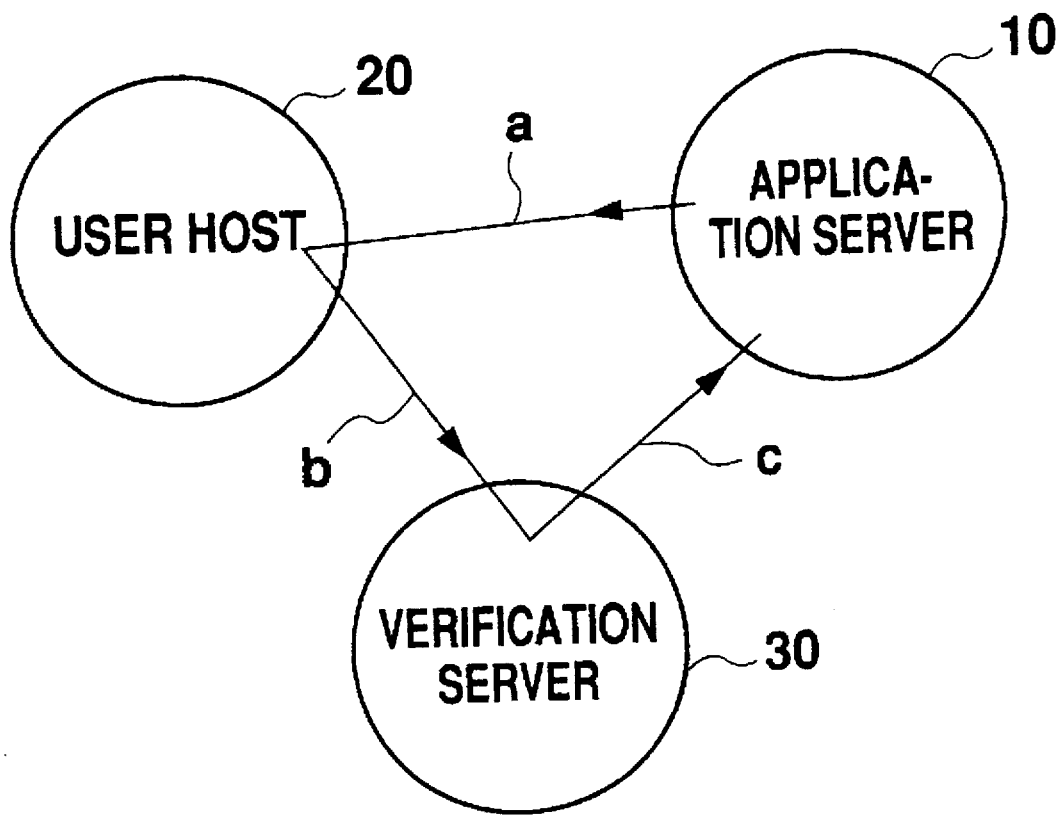
FIG. 1. Drawing showing the configuration of the preferred embodiment.

FIG. 1 shows the relative positions on a network of a network application server 10, a user host 20 making use of the application server, and a verification server 30 which is used to authenticate the user host 20.

In accordance with one aspect of the preferred embodiment, the verification process performed in authenticating the user host 20 is not performed by the application server 10 but by the verification server 30 which is set up on the network apart from the application server 10. By establishing on the network, separate from the application server 10, a verification server 30 to perform verification processes, each application server 10 is freed from the need to keep valid authentication data for the authentication of user hosts 20 and the need to have functions for verification. Further, although only one application server 10 is shown in FIG. 1, it is also suitable to establish a plurality of application servers 10 on the network, consigning the verification processes for all application servers 10 to a single verification server 30, thereby combining the redundant authentication data verification functions for the plurality of application servers 10 and allowing for the efficient use of resources.

Further, it is also suitable to establish a plurality of verification servers 30 on the network. This way, depending on the sort of authentication required, each application server 10 can resort to the suitable verification server. For instance, it is possible to store authentication data using signatures and authentication data using fingerprints in separate verification servers 30. It is also possible for each user to designate the verification server 30 in which his/her authentication data is kept.

As shown in FIG. 1, by establishing a verification server 30 on the network independently of the application server 10, the exchange of messages during authentication would follow, for instance, the sequence indicated by the arrows in FIG. 1. As shown in FIG. 1, first the application server 10 requests the user host 20 to send authentication data ("a" in FIG. 1) to a verification server. Conventionally, passwords or membership numbers can be used as authentication data; however, it is suitable to use biometric physical quantities such as signatures. In particular, as mentioned above, signature data can be input by preparing a low-priced tablet for the user host 20.

The user host 20, in response to request a, inputs the user's signature data from a tablet, and sends this data to the verification server 30 (shown by "b" in FIG. 1) together with the identification data of the user (for instance, a membership number or user name). The application server judges whether the user host 20 is an authorized user, in effect consigning the verification process necessary for authentication to an external verification server 30. The verification server 30 saves the authentication data and identification data sent from the user host 20 and verifies this against valid authentication data. That is, the verification server 30 has an internal database with identification data and valid authentication data of user hosts 20. This database is searched to extract the valid authentication data (in the preferred embodiment, the instance of signature data is used) for the identity claimed by the user host 20. The extracted authentication data and the authentication data received from the application server 10 are compared, and the verification result is sent back to the application server 10 (indicated by "c" in FIG. 1). Based on this verification result received from the verification server 30, the application server 10 performs the authentication of the user host 20.

In the format of the preferred embodiment, a section performing the verification process is established on the network independent of application server 10, allowing for the elimination of redundant verification functions in a plurality of application servers 10, and guaranteeing the accuracy of the authentication process.

The application server 10 here can be thought of as corresponding to such servers as the WWW server on Internet as well as servers providing various databases and other services.

Figure 2:
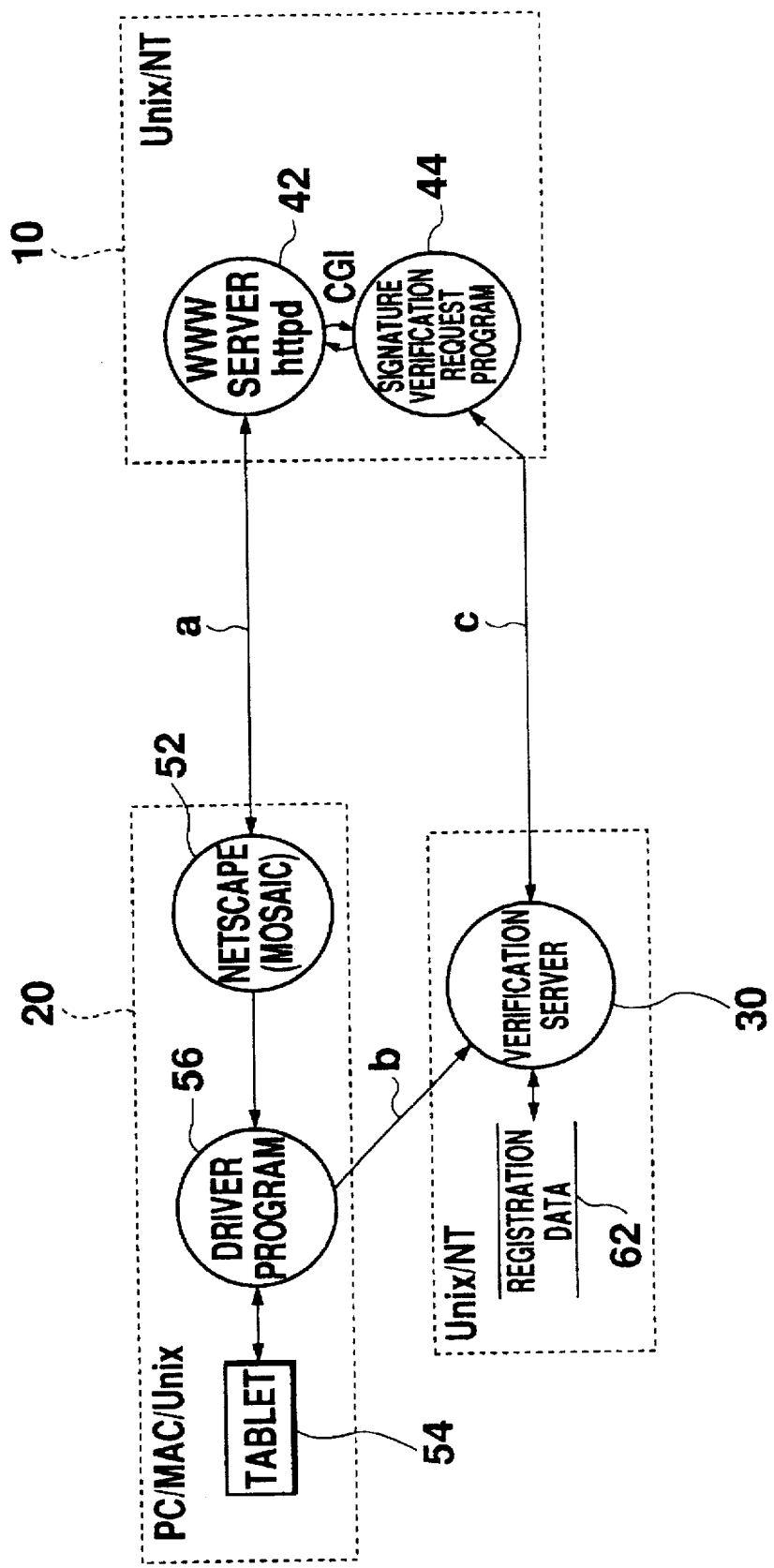
FIG. 2. Drawing showing the detailed configuration of the preferred embodiment.

FIG. 2 is a block diagram showing the detailed configuration of the user host 20, the application server 10 and the verification server 30 of FIG. 1. As shown in FIG. 2, the user host 20 is configured with terminals such as personal computers linked to Internet and connecting to the WWW server 42 by means of Netscape 52, a WWW browser. Although Netscape 52 is used in the preferred embodiment, Mosaic or other WWW browsers are also possible. Aside from Netscape 52, the user host 20 is equipped with a tablet 54 by means of which users can input signature data. Further, a tablet driver program 56 has been installed to control the tablet and to extract signature data. When a request arrives from the application server 10 for authentication data, the tablet driver program 56 receives this request via Netscape 52, and sends authentication data (signature data), which it has obtained through the tablet 54, to the verification server 30. Here, "a", "b", "c", and "d" correspond to the exchange of messages "a", "b", "c", and "d" shown in FIG. 1.

The application server 10 is frequently configured on a UNIX system. As shown in FIG. 2, a WWW server 42 providing multimedia titles and a signature verification request program 44 to check the access rights of the user are installed on the application server 10. The verification server 30, like the application server, is configured on a system such as a UNIX system, and has registration data 62 with a list of authorized users and records of their authentication data. Based on the user name (user identification code) it receives from the above-mentioned user host, it verifies the authentication data (in the preferred embodiment, signature data) received from the user host 20 against initially registered valid authentication data, returning the verification result to the signature verification request program 44 of application server 10.

In the preferred embodiment, the registration data 62 in the verification server 30 is managed by a relational database (hereinafter, RDB). The format of the registration data within the RDB is shown in FIG. 3. As can be seen in FIG. 3, the registration data is recorded in the form of a table with the designated data recorded separately for each authorized user. As indicated in FIG. 3, there is a flag to indicate the various states of the system, used, for instance, as a remove flag (to indicate whether a user has been removed from the system). The Sys Uniq Key is a system key assigned to each user, and is unique in the verification server's table (shown in FIG. 3). The registered tablet type shows the type of tablet used by the user. The signature data is time-sequenced data expressing the movement of the electronic stylus on the tablet 54. This signature data not only records two-dimensional coordinate information, but also includes stylus point pressure and speed, allowing for precise user authentication.

Thus, the RDB in the verification server, with the Sys Uniq Key and the registered signature data, takes the signature data and the Sys Uniq Key received from the user host 20 and checks to verify for validity. The result of the verification is explained later.

The RDB in the preferred embodiment, aside from the Sys Uniq Key and the signature data, records the following items grouped as "System Required Items," as shown in FIG. 3: user name (Name), the user's date of birth (Date of Birth) and the user's telephone number (Phone #). These system required items are used as substitutes for the Sys Uniq Key. That is, as will be explained later, although the Sys Uniq Key is a key kept by the application server 10 and the verification server 30 and used as a key to identify users, the user does not necessarily remember his/her assigned Sys Uniq Key. Therefore, when the user wishes to confirm his/her registered signature data, it is preferable that there are means to identify the user other than the Sys Uniq Key. The System Required Items make it possible to identify the user using not only the Sys Uniq Key but also the user's name, date of birth, or telephone number, etc.

Further, the form used in the preferred embodiment, as shown in FIG. 3, has a provision for optional fields (Optional Fields). Data registered under Optional Fields are management data for checking the system, to be used by the system administrator of the verification server 30 in the administration, etc., of the operation of the verification server 30. As shown in FIG. 3, the management data can consist of various sorts of data: Creation Date, Creation Host, last access date (Last Acc. Date), last accessing user (Last Acc. By), access count, failure count, etc.

A RDB with information on the users corresponding to the RDB in the verification server is also mounted in the application server 10. The contents of the RDB in the application server 10 is shown in FIG. 4. As can be seen in FIG. 4, various registered data are registered separately for each user. As shown in FIG. 4, "verification server name" designates the verification server 30 to be used for verifying the authentication data (signature date) sent by the user. In the configuration shown in FIG. 1, although only one verification server 30 is depicted, it is possible to configure a network with a plurality of verification servers 30. For instance, each user may wish to use the verification server 30 that can be connected to with the greatest ease, or for management purposes the system administrator of the application server 10 may wish to resort to different verification servers 30 for different users.

The flag shown in FIG. 4 and the system unique key (Sys Uniq Key) are identical to the flag and system unique key of FIG. 3. As mentioned above, the Sys Uniq Key in the RDB of the verification server 30 is unique. On the other hand, for users with different verification servers 30, it is possible to assign the same Sys Uniq Key. Therefore, strictly speaking, identification of the user is made on the basis of the combination of Sys Uniq Key and verification server name. The application user key (App. User Key) indicates whether the user is eligible to receive services provided by the application server 10. In some cases, as shown in FIG. 4, an additional application user key (Additional App. User Key) can be set. Further, as shown in FIG. 4, the creation date, last access date (Last Acc. Date), last accessing user (Last Acc. By), access count, and failure count are also registered, in correspondence with the RDB in the verification server 30 shown in FIG. 3. Further, although details are not shown, it is also suitable to register designated registration data in application optional fields.

FIG. 5 shows a table explaining the protocol supported by the verification server relating to the preferred embodiment. As shown in FIG. 5, the protocol "key registration" is used to send a message containing the necessary items from the application server to the verification server 30. The verification server registers these necessary items in its RDB and generates a Sys Uniq Key. This Sys Uniq Key is registered in the verification server's RDB and returned to the application server 10. In this manner, the Sys Uniq Key used to identify the user is generated by the verification server. This Sys Uniq Key is also registered in the RDB of the application server 10, and thus the verification server 30 and the application server 10 share the same Sys Uniq Key.

Next, together with the protocol "signature data registration," the Sys Uniq Key, three signature data, the tablet type, etc. are sent from the application server 10 to the verification server 30, and the valid signature data is registered in the verification server's RDB. Here, three signature data are transmitted so that the verification server can determine composite values for the signature data, and register these composite values in the RDB. If the registration is successful, an "OK" message is returned to the application server 10. On the contrary, in such cases as when registration has already been made, an "error" message is returned. Further, if there is too much of a discrepancy between the three signature data, registration is not completed and an "unstable" message is returned to indicate that the signature data is too unreliable.

When the protocol "verification preparation" is used, the application server 10 sends only the Sys Uniq Key to the verification server 30, and prompts it to read the valid authentication data from the RDB into the cache. Reading the registered authentication data before the actual authentication data verification protocol is used allows for faster verification, as will be explained below. This protocol is used to expedite the verification process, and can be omitted, using only the "verify" protocol explained below. If the valid authentication data is successfully read into the cache, a message ID is returned to the application server. Otherwise, when there has been an error, an "error" message is returned to the application server 10.

When the protocol "verify" is used, the user host 20 sends the Sys Uniq Key, signature data, the tablet type, and the message ID to the verification server 30 and verification is conducted. The message ID is used when the "verification preparation" protocol has been used and a message ID has been returned. As explained below, the verification result is sent to application server 10, using this message ID as a tag to distinguish the user authentication to which it refers. In other words, in the preferred embodiment, the message ID is used both as a number to identify the authentication and as a means to indicate that authentication data has already been read into the cache. In this case, the message ID is first created by the verification server 30 and tagged to the reply to a verification preparation request.

On the other hand, when the "verification preparation" protocol has not been invoked, the message ID merely fulfills the role of identifier, distinguishing the user who is being authenticated. In this case, the message ID is first created by the application server 20.

Depending on whether the verification server itself creates the message ID, the verification server 30 can know whether authentication data has already been read into the cache. If valid authentication data has been read, that data and the received authentication data are compared. If valid authentication data has not been read, valid authentication data is read from the RDB and comparison and verification are performed.

When the two data are extremely close and have been judged to be authenticated as a result of comparison and verification, the value "yes" is returned to the application server 10. On the other hand, if the received authentication data is completely different from the valid authentication data, a value "no" is returned. If, as a result of comparison and verification, it is uncertain whether the authentication data is valid, the value "maybe" is returned to the application server 10. In cases where there is doubt, although differences may exist depending on the application server, the user can be requested to provide signature data one more time. Further, when valid authentication data for comparison and verification cannot be located, an "error" message is sent to the application server 10.

Figure 6:
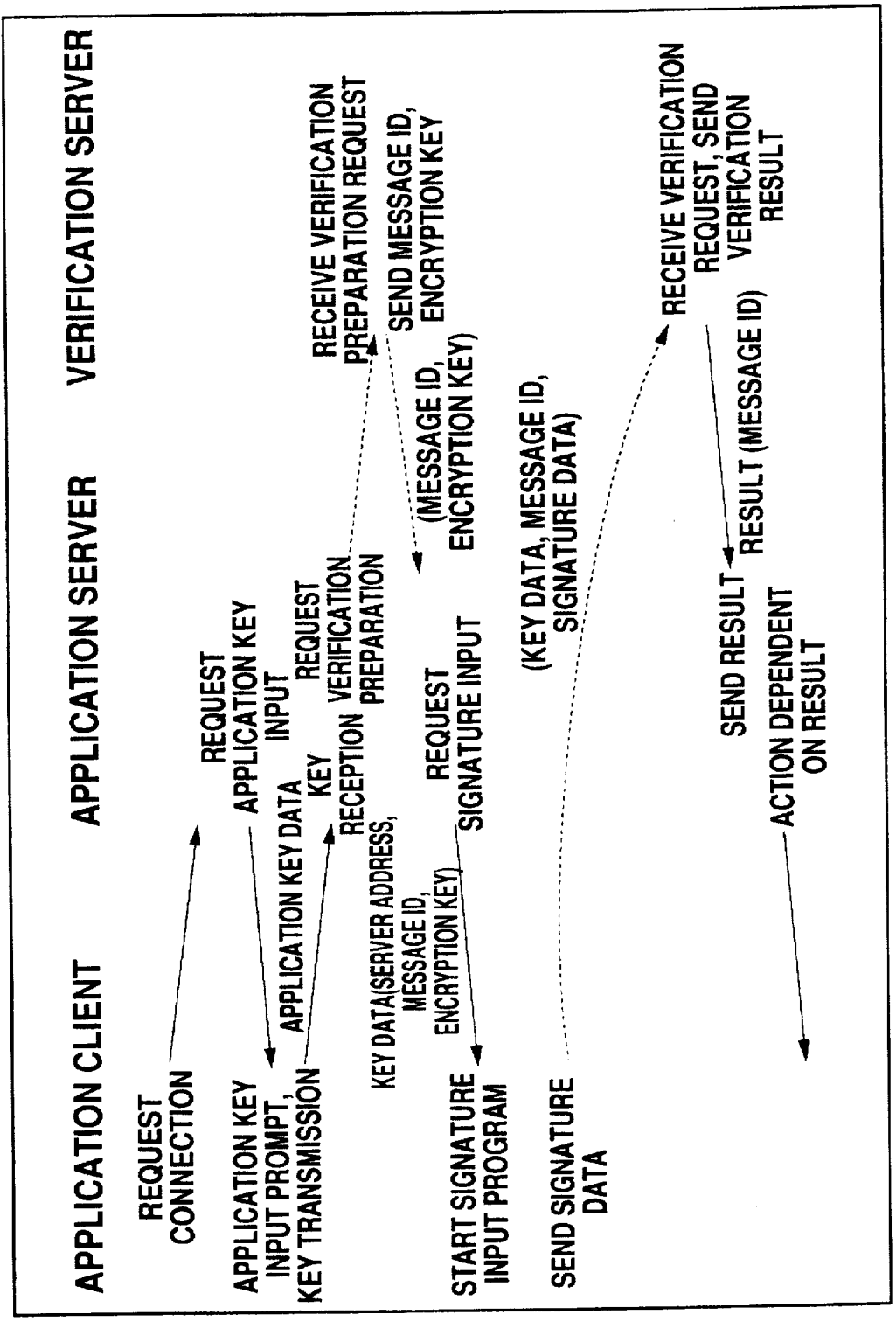
FIG. 6. Diagram explaining the exchange of messages in the preferred embodiment.

Next, the process flow in the authentication of a user will be described with reference to FIG. 6. Hereinafter, this user will be referred to as the application client (FIG. 6). First, the application client requests a connection to the application server 10 through user host 20.

In response to this, the application server 10 requests the application client to input the application key. In response, a prompt is shown on the display device of user host 20 asking for the application key.

When the application client hits the designated key on the keyboard of user host 20, this data is sent to application server 10.

Upon receiving this data, application server 10 sends a signature data verification preparation request to verification server 30. The verification preparation request, as described above, is for the sake of speeding up the process, and may be omitted.

Upon receiving the verification preparation request, the verification server 30, as described above, reads the authentication data from the RDB into the cache, and sends a message ID and an encryption key to application server 10. The encryption key is used to encrypt the transmitted data. If encryption is unnecessary, there is no need to send an encryption key.

Upon receiving the above-mentioned message ID, etc., the application server 10 requests the application client to input his/her signature.

Responding to the signature input request, the server host 20 launches a signature input program. The application client then uses the tablet 54 attached to the user host 20 to input his/her signature. The user host 20 sends the signature input from the tablet 54 to the verification server 30 (verification request). Here, as indicated in FIG. 6, the key data and the message ID are sent together with the signature data to the verification server 30.

The verification server 10, based on the verification request, performs the verification and returns the result to the application server 10. The verification server 30 can determine which application server 10 to send the result to on the basis of the message ID which it receives together with the verification request.

The application server 10 performs the authentication on the basis of the verification result. The process may differ according to the application server 10. However, when the verification result is "yes," the user is authenticated, and otherwise the user is either not authenticated or is requested to repeat the signature input.

As described above, according to the preferred embodiment, since the verification process is consigned to an external verification server, it is possible to reduce the burden on the application server and simplify the verification process.

As described above, in accordance with a first aspect, since the authentication of the user on the network is performed by a verification server separate from the application server, the configuration of the application server is simplified. Further, since a plurality of applications can use the same verification server, the resources of a network can be put to more efficient use.

Further, in accordance with a second aspect, by incorporating a verification preparation request step in advance of the verification, reading the authentication data in advance, it is possible to expedite verification.

What is claimed is:

1. An authentication method for use by application servers on networks to authenticate users of the applications, comprising:

a requesting step wherein one of the application servers request one of the users to send authentication data to a verification server;

a sending step wherein the one of the users, in response to the request of the one of the application servers received during the requesting step, sends the authentication data of the one of the users together with identification data of the one of the users to the verification server;

a verification step wherein the verification server verifies whether the authentication data is a valid authentication data of the one of the users designated by the identification data;

a verification result reporting step wherein the verification server notifies the one of the application servers of a verification result; and an authentication step wherein, based on the verification result returned in the verification result reporting step, the one of the application servers authenticates the one of the users.

2. An authentication method for use by application servers on networks to authenticate users of the applications, comprising:

a requesting step wherein one of the application servers request one of the users to send authentication data to a verification server;

a verification preparation request step wherein the one of the application servers sends an identification data of the one of the users to the verification server, requesting that a valid authentication data of the one of the users be read in advance from a database;

a sending step wherein the one of the users, in response to the request of the one of the application servers received during the requesting step, sends the authentication data of the one of the users together with identification data of the one of the users to the verification server;

a verification step wherein the verification server verifies whether the sent authentication data is a valid authentication data of the one of the users designated by the identification data;

a verification result reporting step in which the verification server notifies the one of the application servers of a verification result; and an authentication step wherein, based on the verification result returned in the verification result reporting step, the one of the application servers authenticates the one of the users.

3. An authentication method for use by application servers on networks to authenticate users of the applications, comprising:

a requesting step wherein one of the application servers request one of the users to send authentication data to one of a plurality of verification servers;

a sending step wherein the one of the users, in response to the request of the one of the application servers received during the requesting step, sends the authentication data of the one of the users together with identification data of the one of the users to the one of the verification servers;

a verification step wherein the one of the verification servers verifies whether the authentication data is a valid authentication data of the one of the users designated by the identification data;

a verification result reporting step wherein the one of the verification servers notifies the one of the application servers of a verification result; and an authentication step wherein, based on the verification result returned in the verification result reporting step, the one of the application servers authenticates the one of the users.

4. The authentication method of claim 3, further comprising:

designating a specific verification server as the one of a plurality of verification servers for receiving the sent authentication data and the sent identification data, for verifying whether the authentication data is the authentication data of the one of the users and for notifying the one of the application servers of a verification result.

5. The authentication method of claim 1, wherein the authentication data includes at least one of signature data and fingerprint data.

6. The authentication method of claim 5, wherein the signature data includes two-dimensional coordinate data, stylus point pressure data and speed data.

7. The authentication method of claim 1, wherein the authentication data includes at least one of password data and membership data.

8. The authentication method of claim 1, wherein the identification data includes at least one of membership data and a name of the one of the users.

9. The authentication method of claim 1, wherein the verification server includes an internal database for storing the authentication data of the one of the users.

10. The authentication method of claim 9, wherein the authentication data includes signature data and system required items.

11. The authentication method of claim 1, further comprising:

a rerequesting step wherein, based on the verification result, the one of the application servers requests the one of the users to send additional authentication data to the verification server.

* * * * *